(12) United States Patent
Sulser et al.

(10) Patent No.: US 9,187,372 B2
(45) Date of Patent: Nov. 17, 2015

(54) DISPERSING AGENT FOR SOLID SUSPENSIONS

(71) Applicant: SIKA TECHNOLOGY AG, Baar (CH)

(72) Inventors: Ueli Sulser, Unterengstringen (CH); Jörg Zimmermann, Winterthur (CH); Lukas Frunz, Dietlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/343,314

(22) PCT Filed: Oct. 2, 2012

(86) PCT No.: PCT/EP2012/069462
§ 371 (c)(1),
(2) Date: Mar. 6, 2014

(87) PCT Pub. No.: WO2013/050369
PCT Pub. Date: Apr. 11, 2013

(65) Prior Publication Data
US 2014/0249254 A1    Sep. 4, 2014

(30) Foreign Application Priority Data
Oct. 3, 2011  (EP) .................................. 11183683

(51) Int. Cl.
| C04B 24/26 | (2006.01) |
| C04B 24/24 | (2006.01) |
| C04B 28/02 | (2006.01) |
| C08F 30/02 | (2006.01) |
| B01F 17/00 | (2006.01) |
| C04B 103/40 | (2006.01) |

(52) U.S. Cl.
CPC ......... C04B 24/2641 (2013.01); B01F 17/0064 (2013.01); C04B 24/243 (2013.01); C04B 24/2647 (2013.01); C04B 24/2688 (2013.01); C04B 28/02 (2013.01); C08F 30/02 (2013.01); C04B 2103/408 (2013.01)

(58) Field of Classification Search
USPC ............................. 524/5; 526/317.1, 318.42
See application file for complete search history.

(56) References Cited

U.S. PATENT DOCUMENTS

| 2010/0137476 A1 | 6/2010 | Sulser et al. |
| 2010/0305238 A1 | 12/2010 | Hampel et al. |
| 2011/0160351 A1 | 6/2011 | Hampel et al. |

FOREIGN PATENT DOCUMENTS

| EP | 2 006 258 | * | 12/2008 | .............. C04B 24/26 |
| EP | 2 006 258 A1 | | 12/2008 | |
| EP | 2 154 118 | * | 2/2010 | .............. C04B 24/16 |
| EP | 2 154 118 A1 | | 2/2010 | |
| EP | 2 410 009 | * | 1/2012 | ................ C07F 9/48 |
| EP | 2 410 009 A1 | | 1/2012 | |
| WO | WO 2009/056553 | * | 5/2009 | .............. C04B 24/26 |
| WO | WO 2009/056553 A1 | | 5/2009 | |

OTHER PUBLICATIONS

Oct. 26, 2012 International Search Report issued in International Application No. PCT/EP2012/069462 (with translation).

* cited by examiner

*Primary Examiner* — Robert Harlan
(74) *Attorney, Agent, or Firm* — Oliff PLC

(57) ABSTRACT

A polymer having the formula (XIV)

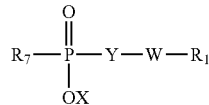

(XIV)

as a dispersing agent for powder-form substances, typically selected from the group consisting of clays, porcelain slip, silicate flour, chalk, carbon black, rock flour, pigments, talc, plastic powders and mineral binders, and methods for improving the flow properties of powder-form substances and mixtures including powder-form substances and polymers having the formula (XIV).

12 Claims, No Drawings

DISPERSING AGENT FOR SOLID SUSPENSIONS

TECHNICAL FIELD

The invention relates to the field of dispersing agents for solid suspensions.

PRIOR ART

The problem in the field of binder plasticizers and dispersing agents for solid suspensions is that of finding improved additives that result in a good dispersing effect for the solid suspensions.

It is also desirable to maintain the effectiveness of the additives, even with extended storage, in particular in their aqueous form.

A readily dispersing and plasticizing effect for the solid suspensions is also advantageous, which allows optimal and practical control of the processing time period, notably when the solid suspension is a mineral binder.

DESCRIPTION OF THE INVENTION

Thus, the object of the invention was to provide dispersing agents that meet the above requirements.

Surprisingly, it has now been found that the use of a polymer having the formula (XIV) as a dispersing agent for powdered substances according to claim 1 achieves this object.

Compared to known additives, the use of the polymer according to the invention having the formula (XIV) as a dispersing agent results in considerably higher dispersing power.

Another crucial advantage of using the polymers having the formula (XIV) as dispersing agents for powdered substances is that these do not lose the high dispersing power even if they are stored over an extended period, in particular in form of their aqueous preparations.

Further aspects of the invention are the subject matter of further independent claims. Particularly preferred embodiments of the invention are the subject matter of the dependent claims.

WAYS TO IMPLEMENT THE INVENTION

The present invention relates to the use of a polymer having the formula (XIV) as a dispersing agent for powdered substances

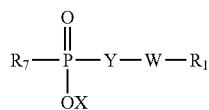
(XIV)

where X is $H^+$, an alkali metal ion, an alkaline earth metal ion, a divalent or trivalent metal ion, an ammonium ion, an organic ammonium group or an organic group having a molecular weight of ≤200 g/mol, X in particular represents $Na^+$ or $K^+$.

Here, Y is one of the formulas (II) to (VI)

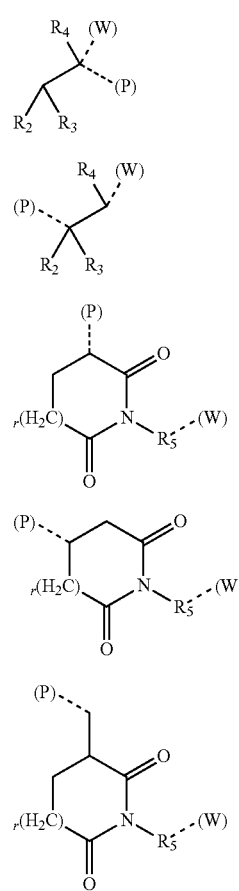

and W is one of the formulas (VII) to (X)

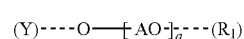
(VII)

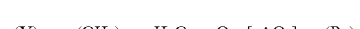
(VIII)

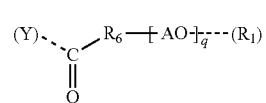
(IX)

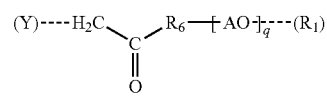
(X)

$R_1$ is H, an alkyl group, preferably having 1 to 20 carbon atoms, an alkylaryl group, preferably having 7 to 20 carbon atoms, or formula (XI)

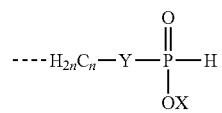
(XI)

where independently of one another the substituent A is a $C_2$ to $C_4$ alkylene group, the subscript q is a value from 2 to 300, in particular from 2 to 50, and particularly preferably from 3 to 10, the subscript n is a value from 2 to 4, preferably a value of 2, and the subscript r is a value from 0 to 1, and where $R_2$, $R_3$ and $R_4$ independently of one another are H, $CH_3$, COOH or $CH_2$—COOH. It is obvious to a person skilled in the art that, in the present context, COOH or $CH_2$—COOH are also understood to mean the salts thereof having alkali metal ions, alkaline earth metal ions, divalent or trivalent metal ions or ammonium ions, such as $COO^-Na^+$ or $CH_2$—$COO^-Na^+$.

$R_5$ is —$CH_2$—$CH_2$— or —$CH_2$—$CH(CH_3)$— and $R_6$ is O or N.

$R_7$ is a polymer comprising at least one monomer M in the polymerized state, wherein $R_7$ has a molecular weight of 500 to 200,000 g/mol, preferably of 2,000 to 50,000 g/mol.

The monomer M is selected from the group consisting of:
monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides, ($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates, vinyl esters of carboxylic acids containing up to 20 carbon atoms, vinyl aromatic compounds having up to 20 carbon atoms, vinyl ethers and allyl ethers of alcohols containing 1 to 12 carbon atoms, (methyl-)poly(oxyalkylene)allyl ethers, (methyl-)poly(oxyalkylene)vinyl ethers, aliphatic hydrocarbons having 2 to 10 carbon atoms and 1 or 2 olefinic double bonds, cyclic and open-chain N-vinyl amides, and mixtures of these monomers.

$R_7$ preferably has a content of ≥80% by weight, in particular ≥90% by weight, particularly preferably ≥95% by weight of monomers M in their polymerized state, based on the molecular weight of $R_7$.

Monomers M in their polymerized state are understood to mean M which are present in the form of a polymer following a radical polymerization reaction.

Polymers having the formula (XIV) can be produced, for example, by the radical polymerization of monomers M using a monosubstituted phosphinic acid having the formula (I)

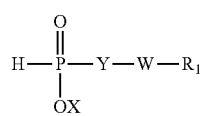

(I)

as a molecular weight regulator, where X, Y, W, $R_1$ are groups as described above.

In the present document, the term "molecular weight regulator" is understood to mean a compound having high transfer constants that are used in radical polymerizations. Molecular weight regulators accelerate chain termination reactions and thus cause a reduction in the degree of polymerization of the resulting polymer, without influencing the overall reaction rate.

Preferably [AO] is the formula (XV)

 (XV)

The subscripts x, y, z here independently of one another each represent the values 0 to 300 and the sum thereof x+y+z is 2 to 300. In addition, in formula (XV), EO=ethyleneoxy, PO=propyleneoxy, BuO=butyleneoxy or isobutyleneoxy. The sequence of the individual structural units EO-, PO-, and BuO may be alternating, statistical, in blocks or random.

Subscript x is preferably from 2 to 50, particularly preferably from 3 to 15, and the sum y+z=0.

"Molecular weight" or "molar weight" within the meaning of the invention is understood to mean the mean molecular weight average Mw.

The term "polymer" in the present document comprises, on the one hand, a pool of macromolecules that are chemically defined, but differ in terms of degree of polymerization, molar mass and chain length, the pool having been produced by a polyreaction (polymerization, polyaddition, polycondensation). On the other hand, the term also includes derivatives of such a pool of macromolecules from polyreactions, which is to say compounds that were obtained by reactions, for example additions or substitutions, of functional groups on predetermined macromolecules and which may or may not be chemically defined.

The bold-face designations such as X, W, Y, Y', P, M and the like in the present document are provided merely for the sake of better reading comprehension and identification.

If X is an organic ammonium group, this is preferably an aliphatic amine or a hydroxyaliphatic amine, in particular a mono-, di- or trialkylamine, such as methyl, ethyl or diethyl amine, or a mono-, di- or tri-(hydroxyalkyl)amine, such as ethanolamine, di- or triethanolamine, tris(hydroxymethyl)methylamine or N-(hydroxyethyl)-N,N-diethylamine.

If X is an organic group having a molecular weight of ≤200 g/mol, it is preferably a $C_1$ to $C_{20}$ alkyl group or a group containing alkylene oxide, having a molecular weight of ≤5.200 g/mol.

The compound having the formula (I) is preferably

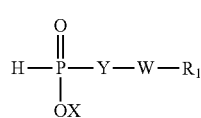

(I)

a compound comprising
X=$H^+$ or $Na^+$
W of formula (VII)
Y of formula (III),
$R_1$=H or $CH_3$
$R_2$=$R_3$=$R_4$=H
wherein the indices are x=14 to 15 and y=z=0.
or
a compound comprising
X=$H^+$ or $Na^+$
W of formula (VII)
Y of formula (III),
$R_1$=H or $CH_3$
$R_2$=$R_3$=$R_4$=H
wherein the indices are x=13 to 14 and y=0 and z=1.
or
a compound comprising
X=$H^+$ or $Na^+$
W of formula (VIII)
Y of formula (III),
$R_1$=H or $CH_3$
$R_2$=$R_3$=$R_4$=H
wherein the indices are x=2 to 8 and y=z=0.

or
a compound comprising
X=H⁺ or Na⁺
W of formula (VIII)
Y of formula (III),
$R_1$=H or $CH_3$
$R_2$=$R_3$=$R_4$=H
wherein the indices are x=3 to 10 and y=z=0.
or
a compound comprising
X=H⁺ or Na⁺
W of formula (VIII)
Y of formula (III),
$R_1$=H or $CH_3$
$R_2$=$R_3$=$R_4$=H
wherein the indices are x=9 to 11 and y=z=0.
or
a compound comprising
X=H⁺ or Na⁺
W of formula (VIII)
Y of formula (III),
$R_1$=H or $CH_3$
$R_2$=$R_3$=$R_4$=H
wherein the sum of indices is x+y=20 a z=0.
or
a compound comprising
X=H⁺ or Na⁺
W of formula (IX)
Y of formula (III),
$R_1$=H or $CH_3$
$R_2$=H, $R_3$=H or $CH_3$, $R_4$=COON or COO⁻Na⁺,
wherein the indices are x=2 to 8 and y=z=0.

The compound having the formula (I) is particularly preferably

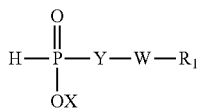

a compound selected from the group consisting of:
sodium[poly(oxyethylene)]phosphinate, preferably having a molecular weight of 400 to 600 g/mol, sodium-2-[poly(oxyethylene)-1,4-dioxybutylene]ethylphosphinate, preferably having a molecular weight of 400 to 600 g/mol, sodium-3-[methyl-poly(oxyethylene)-oxy-]propylphosphinate (degree of alkoxylation: 2 to 8 EO), preferably having a molecular weight of 250-500 g/mol, sodium-3-[methyl-poly(oxyethylene)-oxy-]propylphosphinate (degree of alkoxylation: 3 to 10 EO), preferably having a molecular weight of 300 to 550 g/mol, sodium-3-[methyl-poly(oxyethylene)-oxy-]propylphosphinate (degree of alkoxylation: approximately 10 EO), preferably having a molecular weight of 500 to 600 g/mol, sodium-3[methyl-poly(oxyethylene)-oxy-]propylphosphinate (degree of alkoxylation: approximately 24 EO), preferably having a molecular weight of 1100 to 1200 g/mol, sodium-3-[methyl-poly(oxyethyleneoxypropylene)-oxy-]propylphosphinate (degree of alkoxylation: approximately 20 EO and approximately 20 PO), preferably having a molecular weight of 1500 to 2200 g/mol.

In addition to the monosubstituted phosphinic acid mentioned above, however, it is also possible to use additional conventional molecular weight regulators, such as organic thiols.

The molecular weight regulators according to the invention can be added simultaneously with other reaction components, but also at different times. The addition of the molecular weight regulators is preferably carried out continuously in the course of the polymerization reaction or by charging into the reactor.

The monomers M are selected from the group consisting of:
monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides,
($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates,
vinyl esters of carboxylic acids containing up to 20 carbon atoms, vinyl aromatic compounds having up to 20 carbon atoms,
vinyl ethers and allyl ethers of alcohols containing 1 to 12 carbon atoms, (methyl-)poly(oxyalkylene)allyl ethers, (methyl-)poly(oxyalkylene)vinyl ethers,
aliphatic hydrocarbons having 2 to 10 carbon atoms and 1 or 2 olefinic double bonds, cyclic and open-chain N-vinyl amides,
and mixtures of these monomers.

Preferred monoethylenically unsaturated ($C_3$ to $C_6$)monocarboxylic and dicarboxylic acids are, for example, acrylic acid, methacrylic acid, vinylacetic acid, crotonic acid, fumaric acid, maleic acid, itaconic acid and their C1 to C20 alkyl esters and (methyl-)poly(oxyalkylene)esters, and their amides, nitriles and anhydrides thereof.

The following shall be mentioned by way of example: methyl acrylates, ethyl acrylates, methyl methacrylates, ethyl methacrylates, 2-ethylhexyl acrylate, 2-ethylhexyl methacrylate, methyl-polyoxyethylene)acrylate, methyl-poly(oxypropylene)acrylate, methyl-poly(oxyethyleneoxypropylene)acrylate, methyl-poly(oxyethylene)methacrylate, methyl-poly(oxypropylene)methacrylate, methyl-poly(oxyethyleneoxypropylene)methacrylate, maleic anhydride, itaconic anhydride, monomethyl maleate, dimethyl maleate, monoethyl maleate, diethyl maleate, mono-[methyl-poly(oxyethylene)]maleate, mono-[methyl-poly(oxypropylene)]maleate, mono-[methyl-poly(oxyethyleneoxypropylene)]maleate, di-[methyl-poly(oxyethylene)]maleate, di-[methyl-poly(oxypropylene)]maleate, di-[methyl-poly(oxyethyleneoxypropylene)]maleate, alkylene glycol acrylates and methacrylates, alkylene glycol maleates and itaconates, acrylamide, methacrylamide [sic], N,N-dimethyl acrylamide, and dialkylaminoalkylacrylamides and -methacrylamides.

Preferred ($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates are:
($C_1$ to $C_{10}$)hydroxyalkyl acrylates and methacrylates, such as hydroxyethyl acrylate, hydroxypropyl acrylate, hydroxybutyl acrylate, hydroxyethyl methacrylate, hydroxypropyl methacrylate, and hydroxyisobutyl methacrylate.

Preferred vinyl monomers are, for example, vinyl acetate, vinyl propionate, vinyl laurate, vinyl stearate, vinyl ester of Versatic acid, and N-vinylpyrrolidone.

Preferred vinyl aromatic compounds are o- and p-methylstyrene, vinyltoluene and particularly preferably styrene.

Preferred vinyl ethers that should be mentioned are, for example, methyl vinyl ether, ethyl vinyl ether, butyl vinyl ether, 4-hydroxybutyl vinyl ether, isopropyl vinyl ether, propyl vinyl ether, vinyl isobutyl ether and dodecyl vinyl ether.

Particularly preferred vinyl monomers that should be mentioned are the vinyl ethers of the methyl-polyalkylene glycols, such as methyl-poly(oxyethylene)vinyl ether (degree of alkoxylation: 2 to 24 EO), methyl-poly(oxypropylene)vinyl ether (degree of alkoxylation: 2 to 20 EO) and methyl-poly(oxyethyleneoxypropylene)vinyl ether having variable EO:PO ratios.

However, it is also possible to use open-chain N-vinylamide compounds, such as N-vinylformamide, N-vinyl-N-methylformamide, N-vinylacetamide, and N-vinyl-N-methylacetamide.

Additional preferred monomers are, for example, (C1-C10)alkyl allyl ethers, and very particularly preferred are the poly(oxyalkylene)allyl ethers and the methyl-poly(oxyalkylene)allyl ethers, which may have different degrees of alkoxylation. The following are be mentioned as examples: poly(oxyethylene)allyl ethers, poly(oxypropylene)allyl ethers, poly(oxyethyleneoxypropylene)allyl ethers having variable EO:PO ratios, methyl-poly(oxyethylene)allyl ethers, methyl-poly(oxypropylene)allyl ethers and methyl-poly(oxyethyleneoxypropylene)allyl ethers having variable EO:PO ratios.

Ethylene, propylene, 1-butene, isobutene and isoprene shall be mentioned by way of example as aliphatic hydrocarbons having 2 to 8 carbon atoms and one or two olefinic double bonds.

In addition, all further ethylenically unsaturated monomers, the polymerization of which proceeds according to a radical-initiated mechanism, are possible.

Particularly preferred are the monomers M selected from the group consisting of:
monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides,
($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates,
vinyl esters of carboxylic acids containing up to 20 carbon atoms, vinyl aromatic compounds having up to 20 carbon atoms,
vinyl ethers and allyl ethers of alcohols containing 1 to 12 carbon atoms, (methyl-)poly(oxyalkylene)allyl ethers, (methyl-)poly(oxyalkylene)vinyl ethers.

Most preferably the monomers M are monoethylenically unsaturated ($C_3$ to $C_6$)monocarboxylic and dicarboxylic acids, in particular acrylic acid, methacrylic acid and maleic acid, and their C1-C20 alkyl esters and (methyl-)poly(oxyalkylene)esters.

The following monomer classes are further preferred as monomers M mixtures:
monoethylenically unsaturated ($C_3$ to $C_6$)monocarboxylic and dicarboxylic acids and their $C_1$-$C_{20}$ alkyl esters and (methyl-)poly(oxyalkylene)esters, their amides, nitriles and anhydrides,
($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates,
vinyl ethers and allyl ethers of alcohols containing 1 to 12 carbon atoms, (methyl-)poly(oxyalkylene)allyl ethers, (methyl-)poly(oxyalkylene)vinyl ethers.

The following monomer classes are further preferred as monomers M mixtures:
monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides,
vinyl esters of carboxylic acids containing up to 20 carbon atoms, vinyl aromatic compounds having up to 20 carbon atoms,
vinyl ethers and allyl ethers of alcohols containing 1 to 12 carbon atoms, (methyl-)poly(oxyalkylene)allyl ethers, (methyl-)poly(oxyalkylene)vinyl ethers.

The radical polymerization is preferably carried out in emulsion, in bulk, or in solution, preferably in solution, particularly preferably in water.

The radical polymerization can be carried out in the manner known to a person skilled in the art, typically in a polymerization reactor that is equipped with an agitator, multiple feed vessels and lines, reflux condensers, and heating and cooling devices, and that is suited for operating under an inert gas atmosphere and at positive or negative pressure.

It is further advantageous if the radical polymerization includes a radical initiator selected from the group consisting of:
peroxodisulfates such as sodium, potassium or ammonium peroxodisulfate;
2,2'-Azobisisobutyronitrile;
and redox systems based on hydroperoxides, such as hydrogen peroxide, t-butylhydroperoxide and cumene hydroperoxide, which are used alone or together with redox initiators, such as sodium bisulfite, sodium sulfite, ascorbic acid, isoascorbic acid and sodium formaldehyde sulfoxylate.

The term "radical initiator" in the present document is understood to mean a compound as it is described as an initiator in CD Römpp Chemie Encyclopedia, 9th Edition, Version 1.0, Georg Thieme Publishing House, Stuttgart 1995, suitable for radical polymerizations.

The polymerization temperatures depend on the decay constant and normally range from 50 to 120° C., preferably 60 to 80° C., particularly preferably 80 to 100° C.

The mol % ratio of the monosubstituted phosphinic acid or the salt thereof to the monomers M used in the radical polymerization is preferably 0.1 to 20, preferably 1 to 5, based on the total molar amount of the monosubstituted phosphinic acid and monomers M used in the radical polymerization.

The radical initiator is preferably used at a ratio of 0.001 to 10% by weight, preferably 0.05 to 5% by weight, particularly preferably at a ratio of 0.1 to 2% by weight, based on the total weight of the monomers M.

It is also possible to charge a small portion, approximately 5 to 10% by weight, of the total quantity of the molecular weight regulator into the reactor, together with a small weight fraction, approximately 5 to 10% by weight, of the total radical initiator quantity, and to then add the reaction components simultaneously via separate feeds, which is to say the addition of the molecular weight regulator is carried out simultaneously with the monomer addition, wherein the metered quantities are adjusted so that preferably the majority of the molecular weight regulator is added during the same time period in which the monomers are also fed.

In additional preferred embodiments, the metered addition of the molecular weight regulator is carried out by way of modes of operation in which the addition of the molecular weight regulator is done before the feeding of monomer is started.

The powdered substance is preferably selected from the group consisting of clays, porcelain slip, silicate flour, chalk, carbon black, rock flour, pigments, talc, plastic powders and mineral binders.

The powdered substance is preferably a solid suspension, in particular an aqueous slurry of the same.

The powdered substance is preferably a mineral binder.

The mineral binders are hydraulic binders and/or latent hydraulic binders and/or pozzolanic binders. The term "hydraulic binders" in the present document is understood to mean binders that also bind or set even with water, such as hydraulic lime or cement. The term "latent hydraulic binders" in the present document is understood to mean binders that only bind or set under the action of additives (activators), such as granulated blast furnace slag. The term "pozzolanic binders" in the present document is understood to mean binders that do not bind or set independently, but that after moist storage supply strength-forming reaction products by binding calcium hydroxide, such as fly ash, silica fume, and natural pozzolanes, such as trass.

The hydraulic binder is preferably cement.

The polymer of formula (XIV) can be added in form of an aqueous solution, or in anhydrous form, directly to the powdered substances; these may be added preferably in a quantity of approximately 0.01 to 10%, preferably 0.05 to 3% of solids, based on the weight of the powdered substance (dry matter content).

Compared to the known additives, the polymers having the formula (XIV) exhibit considerably higher dispersion power.

Another crucial advantage of using the polymers having the formula (XIV) as dispersing agents for powdered substances is that these do not lose the high dispersing power even if they are stored over an extended period, in particular in form of their aqueous preparations.

The term "dispersing agent" in the present document is understood to mean a substance that facilitates the dispersing of particles in a dispersion medium by lowering the interfacial tension between the two components, which is to say by bringing about wetting.

The invention further relates to a method for improving the flow properties of powdered substances, characterized by adding a polymer having the formula (XIV), as described above, to a powdered substance. Particularly preferred powdered substances are those described above as preferred powdered substances.

The powdered substance is preferably a mineral binder.

The invention also relates to a mixture comprising powdered substances and polymers having the formula (XIV), as they were described above.

The invention further relates to a binder mixture comprising hydraulic binders and polymers having the formula (XIV), as they were described above.

Additionally, the invention relates to a building material that is based on a hydraulic binder comprising a polymer having the formula (XIV), as they were described above.

EXAMPLES

Description of the Measuring Methods

The viscosity was measured on a rotational viscosimeter made by Mettler Toledo of the type RM 180 (measuring system 11, cylinder 1, density 1.1, interval 100, revolution 100 rpm).

The chromatography measurements were carried out with an ACQUITY UPLC® made by Waters Corporation using an ELS and PDA detector as well as a BEH 300 C18, 2.1×100 mm, 1.7 µm column with 0.15% HCOOH in water as mobile phase A and acetonitrile as mobile phase B.

Production of Compounds Having the Formula (I)

Regulator 1

Sodium-3-[methyl-poly(oxyethylene)-oxy-]propylphosphinate (degree of alkoxylation: 2 to 8 EO, Mw 300 to 500 g/mol)

212 g (2 mol) sodium hypophosphite monohydrate, dissolved in 212 g water, was charged into a glass reactor comprising a mechanical agitator, a thermometer and a dropping funnel, and heated to 70° C. Then, simultaneously, both a solution consisting of 350 g (approximately 2 mol) (poly(oxyethylene)allyl methyl ether (degree of alkoxylation: 3 to 8 EO) and 300 g water, and a solution of 10 g sodium persulfate in 100 g water were added dropwise to this solution at 75 to 80° C. within 180 minutes.

Thereafter, the reaction was continued for an additional 30 minutes at 70° C. until allyl methyl ether was no longer detected by way of liquid chromatography.

Regulator 2

Sodium-3-[methyl-poly(oxyethylene)-oxy-]propylphosphinate (degree of alkoxylation: 3 to 10 EO, Mw 400 to 600 g/mol)

The production of Regulator 2 was carried out analogously to the production of Regulator 1, with the difference that a solution consisting of 500 g (approximately 2 mol) (poly(oxyethylene)allyl methyl ether (degree of alkoxylation: 3 to 10 EO) and 300 g water was used instead of a poly(oxyethylene)allyl methyl ether having a degree of alkoxylation of 2 to 8 EO.

Production of Compounds Having the Formula (XIV)

Example 1

P1

Production of a polymer from acrylic acid using Regulator 1 as the molecular weight regulator.

Initial Volume:
60 g (approximately 0.1 mol) Regulator 1 (57.5% in water)
350 g water Feed 1:
576 g (8 mol) acrylic acid
110 g water Feed 2:
60 g (approximately 0.1 mol) Regulator 1 (57.5% in water)
100 g water Feed 3:
24 g sodium peroxodisulfate
100 g water 350 g water and 60 g (approximately 0.1 mol) Regulator 1 (57.5% in water) were charged into a 4-neck round-bottomed flask, holding 2 liters and equipped with a thermometer, an anchor agitator having a coolable agitator seal, a 40-cm bulb condenser and a coolable inlet pipe for feeds with automatic metering devices, and heated to 80° C.

Then, 14 ml was metered in from feed 3. Thereafter, while boiling and stirring, feed 1 was metered in within 180 minutes, and feed 2 and feed 3 were started at the same time and added in such a way that feed 2 was added approximately 5 minutes before the addition of feed 1 was completed.

The feed time of feed 3 was completed approximately 10 minutes after feed 1 ended. Thereafter, the polymerization of the reaction mixture was continued at 100° C. until (approximately 30 minutes) peroxide was no longer detected. After cooling the mixture to 50° C., a clear polymer solution having a solids content of 50.4%, viscosity of 610 mPa·s, and a molecular weight of Mw=5000 g/mol was obtained.

Example 2

P2

Production of a polymer from methacrylic acid using Regulator 1 as the molecular weight regulator.
Initial volume:
350 g water
Feed 1:
860 g (10 mol) methacrylic acid
500 g water
Feed 2:
690 g (approximately 0.9 mol) Regulator 1 (50% in water)
210 g water
Feed 3:
25 g sodium peroxodisulfate
180 g water 350 g water was heated for reflux in a 4-neck round-bottomed flask, holding 3 liters and equipped with a thermometer, an anchor agitator having a coolable agitator seal, a 40-cm bulb condenser and a coolable inlet pipe for feeds with automatic metering devices. Then, 70 ml was metered in from feed 2. Thereafter, 13.6 ml was metered in from feed 3.

Then, with slight reflux and stirring, feed 1 was metered in within 180 minutes, and feed 2 and feed 3 were started at the same time and added in such a way that feed 2 was added approximately 5 minutes before the addition of feed 1 was completed.

The feed time of feed 3 was completed approximately 10 minutes after feed 1 ended. Thereafter, the polymerization of the reaction mixture was continued at 100° C. until (approximately 30 minutes) peroxide was no longer detected. After cooling the mixture to 50° C., a clear polymer solution having a solids content of 41%, viscosity of 1500 mPa·s, and a molecular weight of Mw=6500 g/mol was obtained.

Example 3

P3

Production of a copolymer from acrylic acid, hydroxyethyl acrylate and vinyl ether using Regulator 2 as the molecular weight regulator.
Initial Volume:
300 g water
200 g methyl-poly(oxyethylene)vinyl ether (degree of alkoxylation: approximately 100 EO) (approximately 0.05 mol)
2 g sodium hydroxide (50% in water)
11.5 g (approximately 0.02 mol) Regulator 2 (77% in water)
Feed 1:
7.2 g (10 mol) acrylic acid
23.4 g hydroxyethyl acrylate
50 g water
Feed 2:
1.2 g Rongalit C
10 g water
Feed 3:
2.2 g hydrogen peroxide (35% in water)
10 g water 30 g of feed 1 and 0.05 g iron(II) sulfate heptahydrate were metered to the initial volume while stirring in a 4-neck round-bottomed flask, holding 3 liters and equipped with a thermometer, an anchor agitator having a coolable agitator seal, a 40-cm bulb condenser and a coolable inlet pipe for feeds with automatic metering devices.

Then, solution 2 was added to solution 1, briefly mixed, and metered to the initial volume by way of a metering pump in 10 minutes, while simultaneously dropwise adding solution 3. The temperature of the reaction mixture rose from 21° C. to 33° C. during this process. The solution was continued to be stirred for 15 minutes until peroxide was no longer detected. The clear, slightly brown solution has a solids content of 38%.

Example 4

P4

Production of a polymer from methacrylic acid using Regulator 1 as the molecular weight regulator, with subsequent esterification.

Approximately 580 g (approximately 2 mol COOH) of an aqueous polymethacrylic acid, which was produced by way of Regulator 1, was charged into a 1500 ml reaction vessel, equipped with a mechanical agitator, a temperature monitoring device, a heating mantle and a vacuum pump. Approximately 500 g methyl polyethylene glycol was added to this mixture and, while stirring, approximately 5 g of 37% sulfuric acid was added. The reaction mixture was heated to 175° C., wherein the water was distilled off. After stirring for 30 minutes at this temperature, a mixture consisting of 6.47 g Jeffamine M2070 and 6.47 g 50% sodium hydroxide was carefully added to the reaction mixture. As soon as the reaction mixture had reached 175° C. again, the reaction was carried out at a negative pressure of 80 mbar until the desired yield was achieved, so that approximately 95% of the MPEG was esterified (determined based on UPLC). The melt was cooled off and diluted with water to a solids content of 50%.

Example 5

P5

Production of a copolymer from maleic acid, allyl ether and vinyl ester using Regulator 1 as the molecular weight regulator.

200 g water, 46.4 g maleic acid (0.4 mol), 330 g of an ally polyglycol ether (0.3 mol, Mw=1000 to 2000 g/mol), 8.6 g vinyl acetate (0.1 mol) and 35 g Regulator 1 (50% in water) were charged into a 1000 ml reaction vessel comprising an agitator, a thermometer and a reflux condenser. Then, 0.1 g iron(II) sulfate heptahydrate was added and stirred.

Thereafter, the temperature was brought to 25° C. Afterwards, a solution A, consisting of 135 g water and 14.4 g acrylic acid (0.2 mol), was produced. Additionally, a solution B, consisting of 38 g water and 12 g of 35% hydrogen peroxide, was produced. Moreover, a solution C, consisting of 45 g water and 5 g Rongalit C, was produced. Over a period of 80 minutes, solutions A, B and C were simultaneously added dropwise to the initial volume while stirring. The temperature was maintained between 30 and 45° C. during this period. After the additions were made, stirring was continued for 30 minutes. A colorless, slightly viscous solution having a solids content of 48% was obtained.

Example 6

P6

Production of a copolymer from methacrylic acid and methyl-poly(oxyethylene)methacrylate using Regulator 1 as the molecular weight regulator.

Initial volume 1: 450 g water
Feed 1:
- 775 g polyglycol MA 1000 (Clariant) 70% in water (0.5 mol)
- 129 g methacrylic acid
- 100 g water
- 0.1 g iron(II) sulfate heptahydrate Feed 2:
- 10 g sodium persulfate
- 100 g water Feed 3:
- 114 g Regulator 1 (50%)
- 50 g water The initial volume 1 was heated to 80° C. in a 3-neck flask, holding 1.5 liters and comprising a thermometer and an agitator. Then, 10 ml of feed 2 and 15 ml of feed 3 were added. Thereafter, all feeds were metered in by way of a metering pump within 3 hours in such a way that a reaction temperature of 90° C. to 95° C. was able to be maintained.

After the additions were made, the mixture was continued to be stirred for 30 minutes until peroxide was no longer detected. After cooling the mixture to 50° C., a clear polymer solution having a solids content of 42% was obtained.

Production of Comparison Examples

Comparison Examples VP1 to VP6

Comparison examples VP1 to VP6 were produced analogously to Examples P1 to P6, with the difference that an equimolar amount of sodium phosphite was used instead of the molecular weight regulators Regulator 1 and Regulator 2.

During storage of the comparison examples VP1 to VP6 at 5° C. over 3 months, it was found that the comparison examples formed deposits/precipitations. With corresponding storage, no such deposits/precipitations whatsoever were observed with Examples P1 to P6.

Measurements of Dispersing Power

Measurement of Dispersing Power in Cement 100 g cement CEM I 42.5 was weighed exactly into a beaker. 30 g water was weighed exactly into a second beaker and mixed with 0.5 g of a 40% polymer solution (200 mg solid matter). This mixture was then added to the cement and mixed well for 2 minutes by way of a wooden spatula. Thereafter, the paste was filled into a cone (cone dimensions: height 58 mm, inside width bottom 38 mm, inside width top 19 mm, content 38 ml), and after 15 seconds the cone was raised slowly. The mass that flowed out was then measured crosswise, and the mean value of the two measurements was determined. The values are shown in Table 1.

Measurement of Dispersing Power in Chalk 100 g Nekafill 15 (CaCO$_3$ made by Kalkfabrik Netstal) was weighed into a beaker. 20 g, or 30 g, water was weighed into a second beaker and mixed with 0.5 g of a 40% polymer solution (200 mg solid matter). This mixture was then added to the calcium carbonate and mixed well for 2 minutes by way of a wooden spatula. Thereafter, the paste was filled into a cone (cone dimensions: height 58 mm, inside width bottom 38 mm, inside width top 19 mm, content 38 ml), and after 15 seconds the cone was raised slowly. The mass that flowed out was then measured crosswise, and the mean value of the two measurements was determined. The values are shown in Table 2.

TABLE 1

Dispersing Power in Cement, n.s. = no spreading, * the mass that flowed out was measured again after 60 minutes, and 90 minutes, and for P3 showed a value of 70 mm, and 125 mm, contrary to VP3 and the measurement without polymer (—), where after 60 minutes, and 90 minutes, still no spreading was found.

| Polymer | Polymer | Slump |
|---|---|---|
| P1 | Polymer made of acrylic acid, Regulator 1 | 88 mm |
| P2 | Polymer made of methacrylic acid, Regulator 1 | 79 mm |
| P3 | Copolymer made of acrylic acid, hydroxyethyl acrylate and vinyl ether, Regulator 2 | n.s.* |
| P4 | Polymer made of methacrylic acid, Regulator 1, subsequent esterification | 101 mm |
| P5 | Copolymer made of maleic acid, allyl ether and vinyl ester, Regulator 1 | 135 mm |
| P6 | Copolymer made of methacrylic acid and methyl-poly(oxyethylene) methaycrylate, Regulator 1 | 49 mm |
| VP1 | Polymer made of acrylic acid, sodium phosphite regulator | 64 mm |
| VP2 | Polymer made of methacrylic acid, sodium phosphite regulator | 56 mm |
| VP3 | Copolymer made of acrylic acid, hydroxyethyl acrylate and vinyl ether, Regulator sodium phosphite | n.s.* |
| VP4 | Polymer made of acrylic acid, sodium phosphite regulator, subsequent esterification | 92 mm |
| VP5 | Copolymer made of maleic acid, allyl ether and vinyl ester, sodium phosphite regulator | 133 mm |
| VP6 | Copolymer made of methacrylic acid and methyl-poly(oxyethylene) methaycrylate, sodium phosphite regulator | 39 mm |
| — | Without polymer | n.s.* |

TABLE 2

Dispersing Power in Chalk, n.s. = no spreading

| Polymer | Polymer | Water (g) | Slump |
|---|---|---|---|
| P1 | Polymer made of acrylic acid, Regulator 1 | 30 | 43 mm |
| P2 | Polymer made of methacrylic acid, Regulator 1 | 30 | 56 mm |
| P3 | Copolymer made of acrylic acid, hydroxyethyl acrylate and vinyl ether, Regulator 2 | 20 | 101 mm |
| P4 | Polymer made of methacrylic acid, Regulator 1, subsequent esterification | 20 | 150 mm |
| P5 | Copolymer made of maleic acid, allyl ether and vinyl ester, Regulator 1 | 20 | 154 mm |
| P6 | Copolymer made of methacrylic acid and methyl-poly(oxyethylene) methaycrylate, Regulator 1 | 20 | 153 mm |
| VP1 | Polymer made of acrylic acid, sodium phosphite regulator | 30 | 41 mm |
| VP2 | Polymer made of methacrylic acid, sodium phosphite regulator | 30 | 51 mm |
| VP3 | Copolymer made of acrylic acid, hydroxyethyl acrylate and vinyl ether, Regulator sodium phosphite | 20 | n.s. |
| VP4 | Polymer made of acrylic acid, sodium phosphite regulator, subsequent esterification | 20 | 146 mm |
| VP5 | Copolymer made of maleic acid, allyl ether and vinyl ester, sodium phosphite regulator | 20 | 150 mm |
| VP6 | Copolymer made of methacrylic acid and methyl-poly(oxyethylene) methaycrylate, sodium phosphite regulator | 20 | 123 mm |
| — | Without polymer | 30 | n.s. |

The invention claimed is:

1. A polymer composition comprising:
a polymer having the formula (XIV)

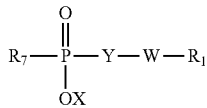
(XIV)

where X is H$^+$, an alkali metal ion, an alkaline earth metal ion, a divalent or trivalent metal ion, an ammonium ion, an organic ammonium group or an organic group having a molecular weight of ≤200 g/mol;
where Y is one of the formulas (II) to (VI)

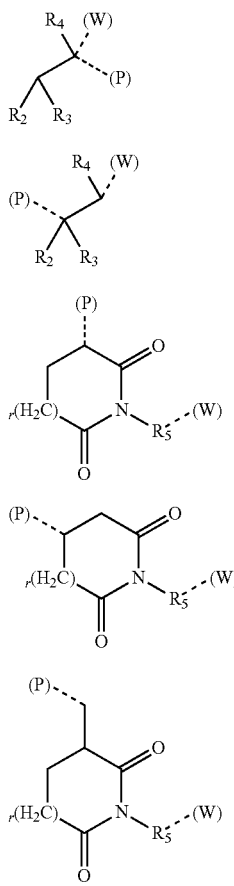

where W is one of the formulas (VII) to (X);

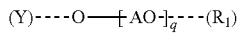
(VII)

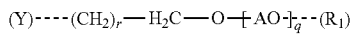
(VIII)

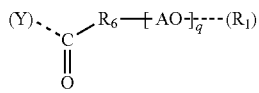
(IX)

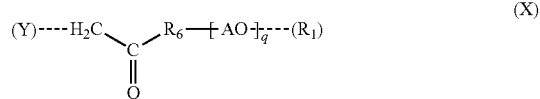
(X)

where $R_1$ is H, an alkyl group, an alkylaryl group, or formula (XI);

(XI)

where independently of one another the substituent A is a $C_2$ to $C_4$ alkylene group, the subscript q is a value from 2 to 300, the subscript n is a value from 2 to 4, and the subscript r is a value from 0 to 1;
where $R_2$, $R_3$ and $R_4$ independently of one another are H, $CH_3$, COOH or $CH_2$—COOH;
$R_5$ is —$CH_2$—$CH_2$— or —$CH_2$—$CH(CH_3)$—; and
$R_6$ is O or N;
and $R_7$ is a polymer comprising at least one monomer M in the polymerized state, wherein $R_7$ has a molecular weight of 500 to 200,000 g/mol;
the monomer M being selected from the group consisting of:
monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides,
($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates,
vinyl esters of carboxylic acids containing up to 20 carbon atoms, vinyl aromatic compounds having up to 20 carbon atoms,
vinyl ethers and allyl ethers of alcohols containing 1 to 12 carbon atoms, (methyl-)poly(oxyalkylene) allyl ethers, (methyl-)poly(oxyalkylene)vinyl ethers,
aliphatic hydrocarbons having 2 to 10 carbon atoms and 1 or 2 olefinic double bonds, cyclic and open-chain N-vinyl amides,
and mixtures of these monomers.

2. The composition according to claim 1, further comprising a powdered substance selected from the group consisting of clays, porcelain slip, silicate flour, chalk, carbon black, rock flour, pigments, talc, plastic powders and mineral binders.

3. The composition according to claim 2, wherein the powdered substance is a mineral binder.

4. The composition according to claim 1, wherein the powdered substance is a solid suspension.

5. The composition according to claim 1, wherein the monomers M are selected from the group consisting of:
monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides,
($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates, vinyl esters of carboxylic acids containing up to 20 carbon atoms, vinyl aromatic compounds having up to 20 carbon atoms, vinyl ethers and allyl ethers of alcohols containing 1 to 12 carbon atoms, (methyl-)poly(oxyalkylene)allyl ethers, (methyl-)poly(oxyalkylene)vinyl ethers.

6. The composition according to claim 1, wherein the monomers M are mixtures of the following monomer classes:

monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides, ($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates, vinyl ethers and allyl ethers of alcohols containing 1 to 12 carbon atoms, (methyl-)poly(oxyalkylene)allyl ethers, (methyl-)poly(oxyalkylene)vinyl ethers.

7. The composition according to claim 1, wherein the monomers M are mixtures of the following monomer classes:

monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides, vinyl esters of carboxylic acids containing up to 20 carbon atoms, vinyl aromatic compounds having up to 20 carbon atoms, vinyl ethers and allyl ethers of alcohols containing 1 to 12 carbon atoms, (methyl-)poly(oxyalkylene)allyl ethers, (methyl-)poly(oxyalkylene)vinyl ethers.

8. A method for improving the flow properties of powdered substances, comprising the composition of claim 1, including adding a polymer having the formula (XIV) to a powdered substance,

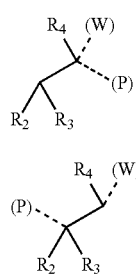

(XIV)

where X is $H^+$, an alkali metal ion, an alkaline earth metal ion, a divalent or trivalent metal ion, an ammonium ion, an organic ammonium group or an organic group having a molecular weight of ≤200 g/mol;

where Y is one of the formulas (II) to (VI)

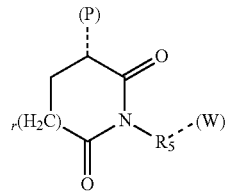

(II)

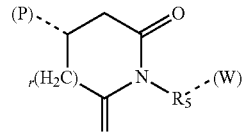

(III)

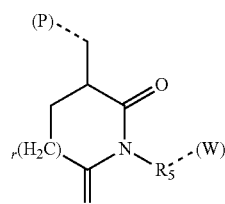

(IV)

(V)

(VI)

where W is one of the formulas (VII) to (X);

$$(Y)\text{----}O\!\!-\!\!\!\left[\!AO\!\right]_{\overline{q}}\text{--}(R_1) \quad (VII)$$

$$(Y)\text{---}(CH_2)_r\text{----}H_2C\text{----}O\!\!-\!\!\!\left[\!AO\!\right]_{\overline{q}}\text{--}(R_1) \quad (VIII)$$

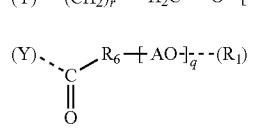

(IX)

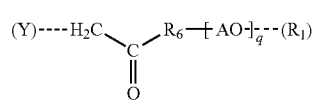

(X)

where $R_1$ is H, an alkyl group, an alkylaryl group, or formula (XI);

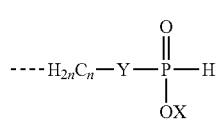

(XI)

where independently of one another the substituent A is a $C_2$ to $C_4$ alkylene group, the subscript q is a value from 2 to 300, the subscript n is a value from 2 to 4, and the subscript r is a value from 0 to 1;

where $R_2$, $R_3$ and $R_4$ independently of one another are H, $CH_3$, COOH or $CH_2$—COOH;

$R_5$ is —$CH_2$—$CH_2$— or —$CH_2$—$CH(CH_3)$—; and $R_6$ is O or N;

and $R_7$ is a polymer comprising at least one monomer M in the polymerized state, wherein $R_7$ has a molecular weight of 500 to 200,000 g/mol;

the monomer M being selected from the group consisting of:

monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides, ($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates, vinyl esters of carboxylic acids containing up to 20 carbon atoms, vinyl aromatic compounds having up to 20 carbon atoms, vinyl ethers and allyl ethers of alcohols containing 1 to 12 carbon atoms, (methyl-)poly(oxyalkylene)allyl ethers, (methyl-)poly(oxyalkylene)vinyl ethers, aliphatic hydrocarbons having 2 to 10 carbon atoms and 1 or 2 olefinic double bonds, cyclic and open-chain N-vinyl amides, and mixtures of these monomers.

9. The method according to claim 8, wherein the powdered substance is a mineral binder.

10. A mixture, comprising the composition of claim 1, including adding a polymer having the formula (XIV) and powdered substances,

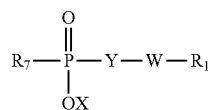

(XIV)

where X is $H^+$, an alkali metal ion, an alkaline earth metal ion, a divalent or trivalent metal ion, an ammonium ion, an organic ammonium group or an organic group having a molecular weight of ≤200 g/mol;

where Y is one of the formulas (II) to (VI)

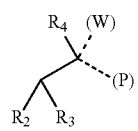

(II)

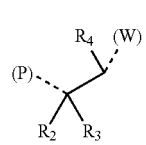

(III)

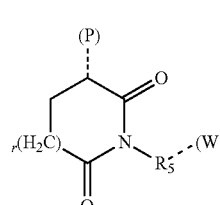

(IV)

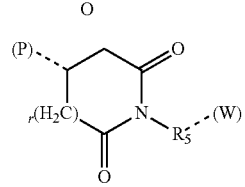

(V)

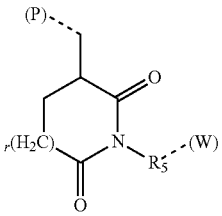

(VI)

where W is one of the formulas (VII) to (X);

$$(Y)\text{----}O\text{--}\!\!\left[\text{AO}\right]_q\!\!\text{--}(R_1) \quad (VII)$$

$$(Y)\text{---}(CH_2)_r\text{---}H_2C\text{---}O\text{--}\!\!\left[\text{AO}\right]_q\!\!\text{--}(R_1) \quad (VIII)$$

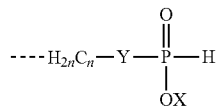

(IX)

(X)

where $R_1$ is H, an alkyl group, an alkylaryl group, or formula (XI);

$$\text{----}H_{2n}C_n\text{---}Y\text{---}\underset{\underset{OX}{|}}{\overset{\overset{O}{\|}}{P}}\text{---}H \quad (XI)$$

where independently of one another the substituent A is a $C_2$ to $C_4$ alkylene group, the subscript q is a value from 2 to 300, the subscript n is a value from 2 to 4, and the subscript r is a value from 0 to 1;

where $R_2$, $R_3$ and $R_4$ independently of one another are H, $CH_3$, COOH or $CH_2$—COOH;

$R_5$ is —$CH_2$—$CH_2$— or —$CH_2$—$CH(CH_3)$—; and $R_6$ is O or N;

and $R_7$ is a polymer comprising at least one monomer M in the polymerized state, wherein $R_7$ has a molecular weight of 500 to 200,000 g/mol;

the monomer M being selected from the group consisting of:

monoethylenically unsaturated ($C_3$ to $C_6$)monocarboxylic and dicarboxylic acids and their C1-C20 alkyl esters and (methyl-)poly(oxyalkylene)esters, their amides, nitriles and anhydrides, ($C_1$ to $C_{20}$)(meth)alkyl acrylates, ($C_1$ to $C_{20}$)(meth)alkylacrylamides, ($C_1$ to $C_{20}$)(meth)alkyl acrylonitriles and (methyl-)poly(oxyalkylene)(meth)acrylates, vinyl esters of carboxylic acids containing up to 20 carbon atoms, vinyl aromatic compounds having up to 20 carbon atoms, vinyl ethers and allyl ethers of alcohols containing 1 to 12 carbon atoms, (methyl-)poly(oxyalkylene)allyl ethers, (methyl-)poly(oxyalkylene)vinyl ethers, aliphatic hydrocarbons having 2 to 10 carbon atoms and 1 or 2 olefinic double bonds, cyclic and open-chain N-vinyl amides, and mixtures of these monomers.

11. A binder mixture, comprising the composition of claim 1, including adding a polymer having the formula (XIV) and hydraulic binders.

12. A building material based on a hydraulic binder, comprising the composition of claim 1, including a polymer having the formula (XIV).

\* \* \* \* \*